United States Patent Office 2,828,160
Patented Mar. 25, 1958

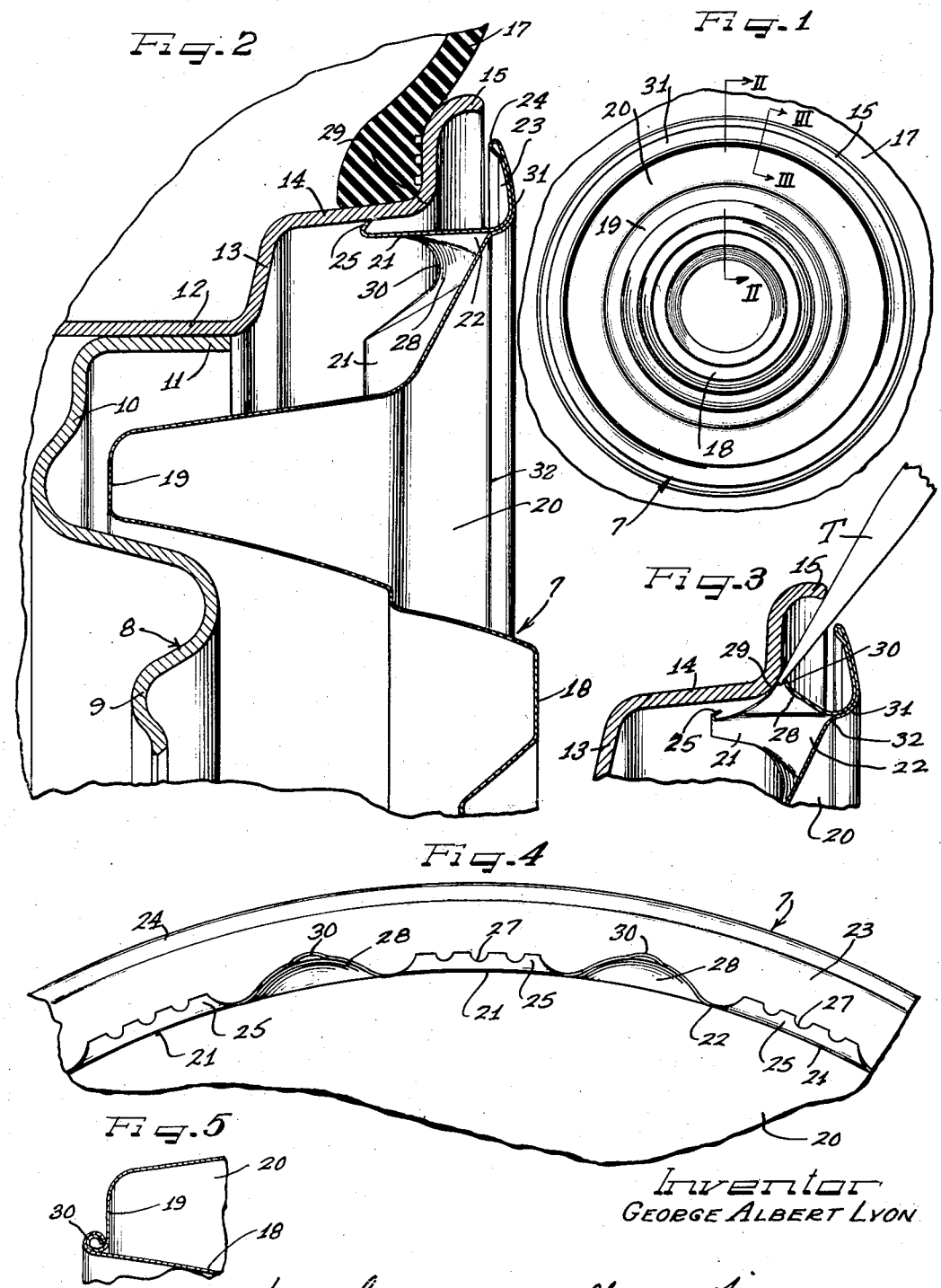

2,828,160

WHEEL COVER

George Albert Lyon, Detroit, Mich.

Application April 27, 1955, Serial No. 504,289

9 Claims. (Cl. 301—37)

The present invention relates to improvements in wheel structures and more particularly concerns the ornamental and protective covering of the outer side of vehicle wheels.

An important object of the present invention is to provide an improved wheel structure with a cover that is retained on the wheel in a novel manner.

Another object of the invention is to provide in a wheel structure improved cover retaining means and seating means cooperable with a tire rim.

A further object of the invention is to provide an improved wheel cover with novel means for supporting the cover on a tire rim of a wheel.

Still another object of the invention is to provide in a wheel cover with a marginal flange therebehind having elongated retaining fingers engageable with a tire rim, improved means for increasing the resiliency of the retaining fingers and thereby enhancing their gripping function in association with a tire rim.

It is another object of the invention to provide a novel cover structure for disposition at the outer side of a vehicle wheel.

Other objects, features and advantages of the present invention will be readily apparent from the following detailed description of a preferred embodiment thereof taken in conjunction with the accompanying drawing, in which:

Figure 1 is a side elevational view of a wheel structure embodying features of the invention;

Figure 2 is an enlarged fragmentary radial sectional view taken substantially on the line II—II of Figure 1;

Figure 3 is a fragmentary radial sectional detail view taken substantially on the line III—III of Figure 1;

Figure 4 is a fragmentary rear elevational view of the cover; and

Figure 5 is a fragmentary sectional view of a modification in the cover.

A cover 7 according to the present invention is constructed and arranged to be applied to the outer side of a vehicle wheel including a disk spider body 8 having a central dished bolt-on flange 9, an annular outer deeply dished annular portion 10 and an outer marginal axially outwardly extending attachment flange 11. A tire rim is supported by the wheel body and has a base flange 12 to which the attachment flange 11 of the wheel spider is suitably secured. Extending generally radially outwardly from the outer side of the base flange 12 of the tire rim is a generally axially outwardly facing side flange 13 which merges with a generally axially outwardly and radially outwardly sloping and radially inwardly facing intermediate flange 14 having at its outer side a generally radially outwardly and then axially outwardly turned terminal flange 15. The tire rim is constructed to support a pneumatic tire 17 which may be of the tubeless type or may be a tire and tube assembly.

Herein the cover 7 is of the deep draw, massive appearing type having a central crown portion 18 for substantially overlying the central portion of the wheel body 8 and joined by a deeply dished annular cover portion 19 to a radially outer annular cover portion 20 which is of a dimension to overlie the outer side of the tire rim. The deeply dished intermediate portion 19 of the cover is arranged to extend down into the substantial axially outwardly opening groove within the outer dished portion of the wheel body.

The cover 7 is adapted to be made from metal strip or sheet susceptible of deep drawing, such as suitable grade of stainless steel, brass, or other suitable sheet metal alloy. It is desirable that the material be capable of receiving the desired outer finish, such as polishing and plating.

In order to enhance the deep draw, massive appearance of the cover 7, it is desirable not only to have the annular intermediate dished portion 19 of the cover of substantial depth relative to the crown 18, but also relative to the radially outer cover portion 20. To this end the outer marginal cover portion 20 is devised to lie opposite the tire rim in substantial axially outwardly spaced relation, and more particularly opposite the terminal flange 15.

For retaining the cover on the outer side of the wheel in press-on, pry-off relation, it is desirable to provide the outer marginal cover portion with generally axially inwardly extending retaining fingers 21 provided as extensions from a continuous generally axially inwardly extending flange 22 preferably provided as an extension from an underturned generally radially inwardly extending annular flange 23 from the outer edge of the cover portion 20. By the underturning of the flange 23, the outer extremity or edge of the cover is provided with a turned annular reenforcing and finishing bead-like structure 24.

It will be recognized that the general construction, arrangement and functioning of the retaining fingers 21 and the continuous annular axially extending flange 22 embody the principles of the invention covered in my Patent 2,624,634, issued January 6, 1953, in that the retaining fingers 21 are self retaining, that is, they are capable of firmly and positively gripping the straight radially inwardly facing and sloping inner face of the tire rim intermediate flange 14, and the fingers are all mutually connected for resilient, self-centering, radially outward thrust tensioned retaining engagement with the tire rim through the continuous flange 22. However, a problem is encountered and overcome by the present invention due to the necessarily great width of the flange 22 and length of the fingers 21 in order to accommodate the desired axially outward disposition or spacing of the outer marginal portion of the annular outer cover section or portion 20 relative to the tire rim. Due to this width of flange and length of retaining finger extension, there is undue tendency toward flexibility or softness in the resilience of the retaining fingers 21 so that the firmness of cover retaining hold or grip of the fingers on the tire rim flange may be impaired as compared to a shorter and thereby stiffer flange and finger arrangement as shown, for example, in my aforementioned patent.

Actual retaining grip of the fingers 21 upon the tire rim flange 14 is effected by short and stiff generally radially and axially outwardly projecting oblique stiff retaining terminal legs or flanges 25 on the respective fingers 21. These terminals 25 grip the rim flange at their edges and are preferably provided with a plurality of shallow notches 27 for providing a corresponding increase in the number of corners which in effect provides spurs that will dig into the face of the rim flange to retain the cover against turning on the wheel due to torque stresses in service.

Initially, the tips of the retaining finger terminals 25 project radially to a common circle that is slightly greater in diameter than the diameter of at least an intermediate section of the tire rim intermediate flange 14 so that as the cover 7 is pressed axially inward into centered position on the wheel, the retaining terminals 25 are progressively and uniformly pressed or deflected radially inwardly for thereby placing the retaining fingers 21 under radially outwardly acting resilient tension for enhancing the retaining grip of the retaining terminals as they cam axially inwardly along the rim flange face.

In order to increase substantially the retaining resilient tension of the retaining fingers 21 means are provided for increasing the resilience of the fingers, and more especially the flange 22 of which the fingers are extensions, so that the resilient tensioning of the fingers as they engage the rim flange 14 will adequately compensate for such factors as the depth of the flange 22 and length of the fingers 21, substantial weight of the cover 7, liability of curbing or other pressures against axially outwardly projecting portions of the cover, and the like. In an economical, expedient structure, such resiliency enhancing or reenforcing means comprise respective gusset-like corrugations 28 in the flange 22 between the fingers 21. Each of the gusset corrugations 28 extends from adjacent the axially outer extremity of the flange 22, that is from adjacent juncture of the flange 22 with the underturned flange portion 23, flaringly to the inner edge extremity of the flange 22, with the side portions of the corrugations merging into the sides of the contiguous fingers 21 adjacent the terminals of the fingers.

By general cold work hardening of the flange 22, as for example according to the method covered in my Patent 2,707,449, issued May 3, 1955, and additionally cold work hardening the gusset corrugations 28 by pressing or displacing the material between the fingers 21 into the corrugation bulges, a high degree of resilient reenforcement is provided for the fingers to enhance their resistance to radial deflection incident to radially inward pressure against the retaining terminals 25 in engagement with the tire rim flange. By preference, the method described in my copending application Serial No. 504,978, filed April 29, 1955, is used in providing the gusset corrugations 28.

In addition to serving as resiliency reenforcement means, the gusset corrugations 28 provide herein wheel engaging stops for determining the axially inward disposition of the cover 7 on the wheel. To this end, the gusset corrugations are bulged radially outwardly from the principal plane of the cover retaining flange 22, and have their axially inwardly directed edges deflected generally radially outwardly and arched to a centrally axially outwardly offset relation to the retaining finger terminals so as to be engageable upon an annular shoulder 29 at juncture of the intermediate and terminal flanges of the tire rim. At their radially outermost central portions, the axially inner terminal edges of the gusset corrugations 28 extend to a circle that is of sufficiently greater diameter than the diameter to which the retaining fingers 21, and more especially the tips of the finger terminals 25 extend so that when the cover is pressed axially inwardly onto the wheel, the projecting edges of the corrugations will seat as stops against the shoulder 29. Through this arrangement the cover 7 is supported in centered non-canting spaced relation to the wheel except for the retaining engagement effected by the fingers 21 and the seating engagement effected by the gusset corrugations 28.

For removing the cover from the wheel, a pry-off tool T (Fig. 3) is inserted behind one or more adjacent ones of the reenforcing gusset corrugations 28 and pry-off leverage applied thereto by fulcruming the tool against the lip of the terminal flange 15 at the tire rim. In order to facilitate insertion of the tip of the tool behind the axially inner seating edge of the gusset corrugations, the central and therefore radially and axially outermost portion of the edge of the gusset corrugation is preferably turned axially and radially outwardly to provide a pry-off lip 30. This lip in assembly with the wheel affords a slight pry-off tool receiving gap between the edge of the lip and the adjacent opposing portion of the rim shoulder 29. In addition, the lip 30 further reenforces the gusset corrugation against deflection.

For reenforcing the radially outer marginal extremity of the cover portion 20, such marginal extremity is preferably formed as an annular reenforcing rib 31. In addition, the underturned flange 23 is preferably nested within the inner side of the rib 31 to thereby afford a multilayer, reenforced cover margin.

At the radially inner side of the marginal rib formation 31, an indented, annular generally axially inwardly and radially outwardly directed narrow reenforcing rib 32 is provided which serves as a cover reenforcement and as a stiffening backing for the axially outer portion of the cover retaining flange 22. In Figure 3 it will be observed that the axially outermost ends of the reenforcing gusset corrugations 28 preferably extend to adjacent the back-up reenforcing rib 32.

Although the cover has been shown in Figure 2 as comprising a one-piece drawn sheet metal plate, if desired, it may be formed from a plurality of metal pieces wherein, as shown in Figure 5, the crown portion 18 of the cover is a drawn member that is lockseamed as at 33 to the radially outer annular portion 20 of the cover, with the intermediate dished portion 19 of the cover comprising either a flange portion of the annular cover part 20, or a flange portion of the crown member 18, as may be preferred. On the other hand, it will be clear that the outer annular cover member 20 could be in the form of a trim ring with the inner crown member 18 a hub cap suitably attachable to the wheel.

It will be understood that modifications and variations may be effected without departing from the scope of the novel concepts of the present invention.

I claim as my invention:

1. In a wheel structure including a wheel body and tire rim supported thereby, a cover for disposition at the outer side of the wheel including an outer marginal portion for overlying the tire rim in spaced relation and carrying therebehind a generally axially extending cover retaining flange having retaining finger extensions thereon and generally axially and radially outwardly projecting corrugated resiliency enhancing projections on the flange adjacent the fingers and engageable as stops against the tire rim.

2. In a wheel structure including a tire rim having a radially inwardly facing annular flange and a generally axially outwardly facing shoulder portion at the axially outer side of said flange, a cover for disposition at the outer side of the wheel including a portion for overlying the tire rim and carrying therebehind a circular cover retaining flange having generally axially inward circumferentially spaced finger extensions thereon for retaining engagement with the radially facing rim flange and reenforcing projections from said flange engageable as centering and axially inward disposition limiting stops against said shoulder, said reenforcing and stop projections comprising gusset-like corrugations intermediate the finger extensions provided with axially inner edges that are engageable with said rim shoulder.

3. In a wheel structure including a tire rim having a radially inwardly facing annular flange and a generally axially outwardly facing shoulder portion at the axially outer side of said flange, a cover for disposition at the outer side of the wheel including a portion for overlying the tire rim and carrying therebehind a circular cover retaining flange having generally axially inward circumferentially spaced finger extensions thereon for retaining engagement with the radially facing rim flange and reenforcing projections from said flange engageable as centering and axially inward disposition limiting stops against said shoulder, said reenforcing and stop projections comprising gusset-like corrugations intermediate the finger extensions provided with axially inner edges that are engageable with said rim shoulder, said inner edges of the gusset corrugations having reenforcing and pry-off lips turned for pry-off tool gap spacing from the shoulder for reception of a pry-off tool thereunder for prying the cover free from the wheel.

4. In a wheel structure including a tire rim having an annular generally radially inwardly facing intermediate flange and a terminal flange joining the intermediate flange on a juncture shoulder, a cover for disposition at the outer side of the wheel including an annular outer marginal portion having therebehind a generally axially outwardly extending retaining flange of substantial depth with circumferentially spaced retaining finger extensions and intermediate the finger extensions generally radially outwardly bulged gusset-like corrugations, said fingers being engageable retainingly with the intermediate flange and said gusset corrugations having generally radially outwardly and axially inwardly directed edges engageable with said juncture shoulder for determining axially inward disposition of the cover relative to the wheel and maintaining said radially outer cover portion in substantial spaced relation to the tire rim.

5. In a cover for disposition at the outer side of a vehicle wheel, a circular cover member having therebehind a circular cover retaining flange provided with generally axially inwardly directed retaining finger extensions and intermediate the fingers generally radially projecting gusset-like reenforcing corrugations, said flange and said cover portion being in annular shouldering reenforcing relation adjacent the axially outer ends of the gusset corrugations.

6. In a cover for disposition at the outer side of a vehicle wheel, a circular cover member having an outer annular marginal portion with a reenforcing and cover retaining circular flange structure of generally L-shape with a portion nested behind said marginal portion and another portion extending generally axially inwardly and provided with cover retaining finger extensions, said inwardly extending flange portion having between the finger extensions generally axially extending reenforcing corrugations.

7. In a cover for disposition at the outer side of a vehicle wheel, a circular cover member having an outer annular marginal portion with a reenforcing and cover retaining circular flange structure of generally L-shape with a portion nested behind said marginal portion and another portion extending generally axially inwardly and provided with cover retaining finger extensions, said inwardly extending flange portion having between the finger extensions generally axially extending reenforcing corrugations, said corrugations extending from substantially the juncture of said flange portions to the inner edge of the axially extending flange portion.

8. A circular wheel cover made from sheet metal and having an outer peripheral margin reinforced by multiple layers of metal extending generally radially and defining a shoulder formed to fit over a part of a wheel rim, said margin having therebehind and spaced radially inwardly from its edge a generally axially extending flange provided with a plurality of finger extensions resiliently yieldable in radial directions and mutually resisting such yielding by common connection through said flange, said extensions having radially outwardly extending short and stiff angular terminals for biting engagement with a surface of the wheel, said axially extending flange having longitudinally extending flaringly corrugated projections between said finger extensions, said flange and said projections and resilient extensions and stiff terminals cooperating with each other in self-centering the cover on the wheel.

9. In a wheel structure including a tire rim having an intermediate generally axially extending and radially inwardly facing annular flange, a circular wheel cover having a peripheral turned margin provided with a generally axially inwardly extending continuous circular flange, said axial flange having arcuate spaced cut away sections alternating with inwardly extending cover retaining portions all connected together in said continuous flange, each of said portions terminating in a turned radially extending stiff edge of relatively narrow width in a radial direction for engaging edgewise against said rim flange, each of said axial flange portions being resiliently yieldable in a radial direction upon its stiff edge engaging the rim flange and when thus stressed applying resilient pressure to hold the edge in resilient gripping engagement with the rim flange, said arcuate cut away sections being axially corrugated to afford added resilient stiffness in the flange and affording pry-off tool engageable generally axially inwardly directed edges.

References Cited in the file of this patent

UNITED STATES PATENTS

| | | |
|---|---|---|
| 2,127,220 | Horn | Aug. 16, 1938 |
| 2,624,630 | Lyon | Jan. 6, 1953 |
| 2,660,479 | Lyon | Nov. 24, 1953 |